US010708566B2

(12) United States Patent
Rivera et al.

(10) Patent No.: US 10,708,566 B2
(45) Date of Patent: Jul. 7, 2020

(54) METHOD FOR PROCESSING SIGNALS WITH OPERATING STATE-DEPENDENT HANDLING OF MULTIMEDIA ATTRIBUTES AND ELECTRONIC DEVICE THEREOF

(71) Applicant: Samsung Electronics Co., Ltd., Suwon-si, Gyeonggi-do (KR)

(72) Inventors: Don Joseph Rivera, Quezon (PH); Geraldine Forto, Balagtas (PH); Jose Ricardo Iv Ruiz, Navotas (PH); Mark Joie Labios, Caloocan (PH); Marvin Alec Padua, Quezon (PH); Maxine Claryze Micu, Antipolo (PH); Yongduk Hwang, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 15/428,730

(22) Filed: Feb. 9, 2017

(65) Prior Publication Data

US 2017/0353705 A1    Dec. 7, 2017

(30) Foreign Application Priority Data

Jun. 6, 2016    (PH) .............................. 1-2016-000220

(51) Int. Cl.
*H04N 9/79* (2006.01)
*G11B 27/11* (2006.01)
*G11B 27/36* (2006.01)
*H04N 5/76* (2006.01)

(52) U.S. Cl.
CPC ........... *H04N 9/7921* (2013.01); *G11B 27/11* (2013.01); *G11B 27/36* (2013.01); *H04N 5/76* (2013.01)

(58) Field of Classification Search
CPC .................................................... H04N 9/7921
USPC ........................................................ 386/228
See application file for complete search history.

(56) References Cited

U.S. PATENT DOCUMENTS

| 2002/0052732 A1* | 5/2002 | Akita ................. G01C 21/3688 704/200.1 |
| 2012/0271882 A1* | 10/2012 | Sachdeva ......... H04N 21/26258 709/204 |
| 2013/0031162 A1* | 1/2013 | Willis ................. H04L 65/1069 709/203 |
| 2013/0051755 A1* | 2/2013 | Brown ............. H04N 21/25875 386/241 |

(Continued)

FOREIGN PATENT DOCUMENTS

JP    2001-266489 A    9/2001

*Primary Examiner* — Eileen M Adams
*Assistant Examiner* — Daniel T Tekle
(74) *Attorney, Agent, or Firm* — Jefferson IP Law, LLP

(57) ABSTRACT

A method for playing a media file in an electronic device is provided. The method includes running, on an electronic device having an operating system (OS), a media presentation system, receiving, at the media presentation system, from a source a media file including audio and video signals, wherein the video signals include the video container of a form suitable for representation on a video output component of the electronic device, playing, at the media presentation system, the media file by processing the audio and video signals, and manipulating, at the media presentation system, the video container depending on an operating state of one or both of the media presentation system and the electronic device while the audio and video signals are being processed.

17 Claims, 11 Drawing Sheets

(56) References Cited

U.S. PATENT DOCUMENTS

2013/0209065 A1\* 8/2013 Yeung .............. H04N 21/41407
386/248

\* cited by examiner

METHOD FOR PROCESSING SIGNALS WITH OPERATING STATE-DEPENDENT HANDLING OF MULTIMEDIA ATTRIBUTES AND ELECTRONIC DEVICE THEREOF

CROSS-REFERENCE TO RELATED APPLICATION(S)

This application claims the benefit under 35 U.S.C. § 119(a) of a Philippines patent application filed on Jun. 6, 2016 in the Philippines Intellectual Property Office and assigned Serial number 1-2016-000220, the entire disclosure of which is hereby incorporated by reference.

TECHNICAL FIELD

The present disclosure relates to signal processing in electronic computing devices. More particularly, the present disclosure relates to a method, system, apparatus, and computer-readable medium suitably arranged for use in processing media signals including audio and video signals based on operating state-dependent handling of attributes of multimedia resources.

BACKGROUND

Media files containing audio and video signals are commonly played using media player applications running on electronic devices, such as desktop computers, laptop computers, tablet computers, mobile phones, and the like. Devices such as these are employed with combined hardware and software techniques that can be utilized to provide cooperative multitasking which enables multiple applications to be run simultaneously. For example, one media player application can be run alongside an enterprise resource planning (ERP) or business management application.

Running a media player application which renders multimedia attributes, such as audio and video contents alongside two or more equally resource-intensive applications often consumes extraordinary fractions of system resources of electronic devices which can cause them to stop responding. These resources may include at least one of the following in whole or in part: processor cycles, memory, bandwidth reception, drivers, battery state of charge, and disk input/output operations. It is therefore desirable to handle attributes of multimedia resources being played by media player applications in such a way that system resources of electronic devices running them are kept to a minimum level.

U.S. Pat. No. 9,066,124 published and issued to Acer Incorporated on 23 Jun. 2015 discloses methodologies for control of an application executed at an electronic device. The prior methodologies comprise using the application to process video signals and associated audio signals provided from a source for playback at the electronic device. The prior methodologies further comprise detecting that the video/audio application has been placed into the background, terminating processing of the video signal, and continuing to process the audio signals even though the video signals are no longer processed.

In accordance with the new video/audio switching techniques of the cited prior methodologies, when the electronic device enters a system suspend state, the video/audio application continues to run. However, in this arrangement, the processing of the video signals is terminated, but the audio signals are still played. As such, when in the suspend state, a user may still be able to listen to the audio signals associated with video signals, even though the video signals are no longer processed and displayed on the electronic device. This configuration in which audio is continued to be played while the video processing is terminated conserves power, but also improves user experience because, while in the suspend state, the video/audio application and the audio application operate substantially the same (i.e., audio is still played to the user even though the device is in a suspended state).

The cited prior methodologies employ control of an application which is directed to, or in the form of, a software plug-in that controls an application executed to process and playback video and associated audio signals received from a source. The plug-in is configured to detect that the application has been placed into the background, and terminate processing of the video signals without affecting processing and playback of the audio signals, wherein the application continues to run with the audio only until it is terminated, suspended, or placed into the foreground.

A problem associated with the cited prior methodologies is that the termination of the processing of the video signals, while it conserves computational resources of electronic devices, requires reloading of the terminated processes associated with the video signals when there is a need to do so in the case where the video/audio application is placed from one operating state to another (e.g., from background to foreground). Re-initializing a once terminated process associated with the processing of video signals introduces significant delay in loading the video/audio application and/or rendering the contents associated with the video signals. Such delay can significantly impede and/or interfere with an optimal responsive performance of an electronic device running the application.

There is therefore a need for computer-implemented arrangements which minimize use of system resources of an electronic device when processing media signals based on operating state-dependent handling of attributes of multimedia resources, such as audio and video signals, and which also prevents processing delays that can impede and/or interfere with the electronic device's optimal responsive performance.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for processing signals with operating state-dependent handling of multimedia attributes.

In accordance with an aspect of the present disclosure, a method of signal processing with operating state-dependent handling of multimedia attributes which may include a video container is provided. The method includes running, on an electronic device having an operating system (OS), a media presentation system, receiving, at the media presentation system, from a source a media file including audio and video signals, wherein the video signals include the video container of a form suitable for representation on a video output component of the electronic device, playing, at the media presentation system, the media file by processing the audio and video signals, and manipulating, at the media presentation system, the video container depending on an operating state of one or both of the media presentation system and the electronic device while the audio and video signals are being processed.

In an implementation, the manipulating operation comprises removing and inserting the video container from and back into the video signals when the media presentation system is caused by the electronic device to place in a background and a foreground, respectively, of the OS of the same electronic device.

The provision of removing and inserting the video container from and back into the video signals while both of the audio and video signals are being processed enables the media presentation system, which may be a media player application, to effect a normal audio-video mode of operation if it is specifically placed in an active state in the foreground and an audio-only mode of operation if it is specifically placed in a background state in the background of the OS of the electronic device without terminating any single process or combination of processes associated with the processing of the audio and video signals. This thereby ensures that any transition from the audio-video mode to the audio-only mode, and vice versa, through which the media presentation system may undergo does not require re-initialization of said process or combination of processes associated with the processing of the audio and video signals. In turn, this provision effectively minimizes use of system resources of the electronic device when processing the audio and video signals and prevents processing delays that can impede and/or interfere with the electronic device's optimal responsive performance.

In accordance with another aspect of the present disclosure, a method for playing a media file in an electronic device is provided. The method includes the operations of playing the media file in an audio-video mode by processing media signals, wherein the media signals comprise at least one media container, detecting an event which triggers switching a mode to an audio-only mode, and playing the media file in the audio-only mode in response to the event, wherein the audio-video mode allows to play both audio and video contents of the media file, and wherein the audio-only mode allows to play only the audio contents of the media file.

In accordance with another aspect of the present disclosure, an electronic device for playing a media file is provided. The electronic device includes at least one processor, and at least one memory coupled to the at least one processor and comprising instructions executable by the at least one processor. The at least one processor is configured to execute the instructions to play the media file in an audio-video mode by processing media signals, wherein the media signals comprise at least one media container, detect an event which triggers switching a mode to an audio-only mode, and play the media file in the audio-only mode in response to the event, wherein the audio-video mode allows to play both audio and video contents of the media file, and wherein the audio-only mode allows to play only the audio contents of the media file.

In accordance with another aspect of the present disclosure, a non-transitory computer-readable medium comprises computer executable instructions that when executed by a processor of an electronic device cause the processor to effectuate is provided. The method includes the operations of playing the media file in an audio-video mode by processing media signals, wherein the media signals comprise at least one media container, detecting an event which triggers switching a mode to an audio-only mode, and playing the media file in the audio-only mode in response to the event, wherein the audio-video mode allows to play both audio and video contents of the media file, and wherein the audio-only mode allows to play only the audio contents of the media file.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
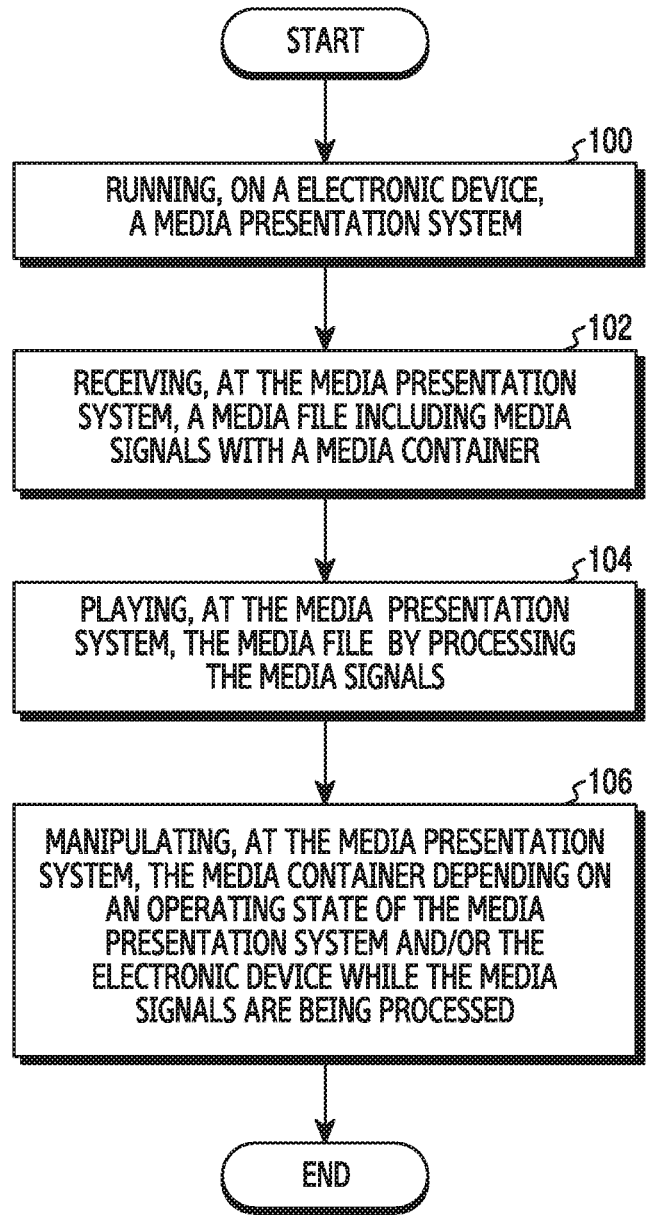
FIG. 1 is a flow diagram of a computer-implemented method for processing a signal in an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various arrangements such as method, system, data processing apparatus, computer-readable medium or computer program product, and their associated computer-implemented and/or computer-enabled processes and various embodiments are disclosed for signal processing based on operating state-dependent handling of attributes of multimedia resources such as audio and video resources in electronic devices in accordance with the principles and concepts of the present disclosure. These arrangements, their embodiments, their features and other possible aspects of the present disclosure are described below and are accompanied with non-limiting illustrations through appropriate diagrams.

The signal processing arrangements of the present disclosure, including various computer-implemented, computer-based, computer-assisted, and/or computer-designed aspects, methods, processes, and configurations, may be implemented on a variety of electronic devices and systems, including electronic client devices and/or server computers, wherein these electronic devices include the appropriate processing mechanisms and computer-readable media for storing, fetching, executing, and interpreting computer-readable instructions, such as programming instructions, codes, signals, and/or the like.

Further, various embodiments of the present disclosure may be implemented on, or in conjunction with, existing controllers in control systems of computers or electronic devices which are well-known in the art. All the ensuing disclosures and accompanying illustrations of the preferred various embodiments of the present disclosure are merely representative for the purpose of sufficiently describing the manner by which the present disclosure may be carried out into practice in various ways other than the ones outlined and/or exemplified in the ensuing description.

It is to be understood and appreciated by a person skilled in the art or having ordinary skills in the art, however, that the implementations used to describe how to make and use the present disclosure may be embodied in many alternative forms and should not be construed as limiting the scope of the appended claims in any manner, absent express recitation of those features in the appended claims. All the diagrams and illustrations accompanying the ensuing description should also not be construed as limiting the scope of the appended claims in any manner.

It is also to be understood and appreciated that the use of ordinal terms like "first" and "second" is used herein to distinguish one element, feature, component, calculation or process operation to another and should not also be construed as limiting the scope of the appended claims, and that these and such other ordinal terms that may appear in the ensuing description are not indicative of any particular order of elements, features, calculations, components or process operations to which they are attached. For example, a first element could be termed a second element. Similarly, a second element could be termed a first element. All these do not depart from the scope of the herein disclosure and its accompanying claims.

Unless the context clearly and explicitly indicates otherwise, it is to be understood that like reference numerals refer to like elements throughout the ensuing description of the figures and/or drawings, that the linking term "and/or" includes any and all combinations of one or more of the associated listed items, and that some varying terms of the same meaning and objective may be interchangeably used.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an moving picture experts group (MPEG-1 or MPEG-2) audio layer-3 (MP3) player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital versatile disc (DVD) player, an audio, a refrigerator, an air conditioner, a vacuum cleaner, an oven, a microwave oven, a washer, a dryer, an air purifier, a set-top box, a television (TV) box (e.g., SAMSUNG HOMESYNC, APPLE TV, or GOOGLE TV), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

FIG. 1 is a flow diagram of a computer-implemented method for processing a signal in an electronic device according to an embodiment of the present disclosure.

In an embodiment, the present disclosure is arranged to provide a method of signal processing based on operating state-dependent handling of multimedia attributes, as shown in the flow diagram of FIG. 1.

Figure 2:
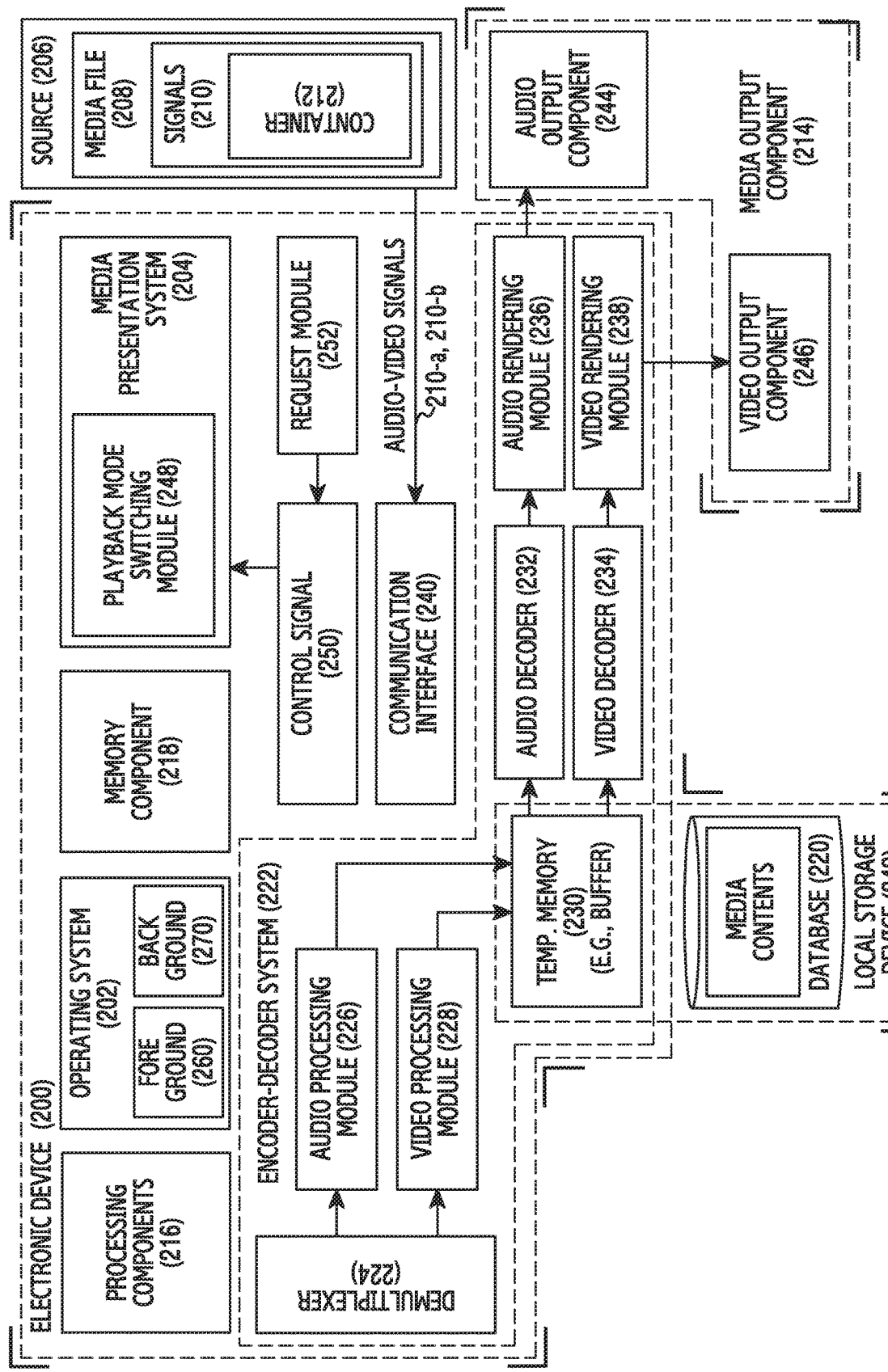
FIG. 2 is a schematic diagram of a computer-implemented system according to an embodiment of the present disclosure.

In a further embodiment, the present disclosure is arranged to provide a computer-implemented system for signal processing based on operating-dependent handling of multimedia attributes, as shown in the schematic block diagram of FIG. 2. It is to be understood and appreciated that the method which is illustrated in FIG. 1 can be performed programmatically via, or carried out through user interaction (UI) with, the hardware and software components of the system which is illustrated in FIG. 2.

FIG. 2 is a schematic diagram of a computer-implemented system according to an embodiment of the present disclosure.

Referring to FIGS. 1 and 2, the signal processing method of the present disclosure may comprise the operations of: firstly, running, on an electronic device 200 having an operating system (OS) 202, a media presentation system 204 at operation 100; secondly, receiving, at the media presentation system 204, from a source 206 a media file 208 including at least media signals 210, wherein the media signals 210 include at least one media container 212 of a form suitable for representation on a media output component 214 of the electronic device 200 at operation 102; thirdly, playing, at the media presentation system 204, the media file 208 by processing the media signals 210 at operation 104; and, fourthly, manipulating, at the media presentation system 204, the media container 212 depending on an operating state of at least one of the media presentation system 204 and the electronic device 200 while the media signals 210 are being processed at operation 106. In other words, with reference to the signal processing method and system of the present disclosure, the media container 212 associated with the media signals 210 may be manipulated in accordance with one or more operating states of any one or both of the media presentation system 204 and the electronic device 200 without interrupting, disrupting, disabling, terminating, blocking, pausing, or cancelling, or altering any logic associated with, any single process or combination of processes associated with the processing of the media signals 210 on the electronic device 200.

The signal processing system of the present disclosure, on one hand, may mainly comprise one or more processing components 216 and at least one memory component 218. The memory component 218 may be coupled to the processing components 216. It is to be understood and appreciated that instructions associated with the arrangements of the present disclosure and their embodiments may be primarily stored on the memory component 218 and may be fetched and executed by the processing components 216 from the memory component 218.

The processing components 216 as described herein may be computer processors which may include the well-known central processing unit (CPU), complex instruction set computing (CISC) processor, reduced instruction set computing (RISC) processor, digital signal processor (DSP), very long instruction word (VLIW) processor, graphics processing unit (GPU), microcontroller, application specific integrated circuit (ASIC), explicitly parallel instruction computing (EPIC), radio-frequency integrated circuit (RFIC), and any suitable combination thereof. Any suitable hybrid arrangement of any two or more of these processors requiring less power to operate is preferable.

The memory component 218 may include any suitable type of dynamic storage device capable of storing information and as well as instructions that can be executed by the processing components 216 and/or other suitable type of non-volatile storage device capable of storing information that can be used by the processing components 216. The memory component 218 may include a main memory, such as a random-access memory (RAM) and a secondary memory, such as, by way of examples, a read-only memory (ROM), a hard disk drive (HDD), a removable storage drive, a magnetic tape drive, an optical disk drive (ODD), and the like.

The signal processing system of the present disclosure may comprise instructions which are executable by the processing components 216 to run the media presentation system 204 on the OS 202 of the electronic device 200. The OS 202 may be any one of the android OS, the apple iOS, the bada OS, the blackberry OS, the java OS, the linux OS, the mac OS, the symbian OS, the ubuntu, the UNIX, the windows, the windows mobile, the windows phone, the windows RT, and the like.

The electronic device 200 may be a desktop computer, a workstation computer, a laptop computer, a tablet computer, a notebook computer, an e-Reader device, a mobile phone, a mobile device, a smart-phone, a PDA, and other such electronic devices which are capable of displaying consumable contents such audio and video contents associated with audio and video signals 210-a, 210b, respectively, that may characterize the media signals 210 from the source 206.

The OS 202 may also employ a database management system 220 commonly used for consumer electronic devices, such as the electronic device 200, and for supporting transactional processing. The database management system 220 may be, by way of examples, the well-known SQLite, SmallSQL, Ingres, PostgreSQL, Pyrrho DBMS, and Embedded MySQL, to name but a few. Media contents associated with the media signals 210 may be stored in the database management system 220. The media contents may include audio contents associated with the audio signal 210-a included in the media file 208, and as well as video contents associated with the video signals 210-b included in the media file 208 from the source 206.

The media presentation system 204 may be a media player application or media player application program that can be implemented either through the front-end components of the electronic device 200 or through any pre-configured, pre-arranged and/or standard back-end components of a remote server computer or a remote computer system (not illustrated) that is in communication with the electronic device 200 over any suitable communication network, such as the Internet. The media presentation system 204 may be rendered and/or represented on the media output component 214 of the electronic device 200 either through the front-end components of the electronic device 200 or through the back-end components of the remote server computer or computer system.

Specifically, the media presentation system 204 may include an audio-video rendering subsystem and an application rendering subsystem. The audio-video rendering subsystem and the application rendering subsystem may also be application programs arranged to work in conjunction with the hardware and software components of the electronic device 200 when the media presentation system 204 is operably installed and operated in the electronic device 200 by a user. The audio-video rendering subsystem may cause representation of the media contents associated with the media signals 210 to be rendered and/or represented on the media output component 214 of the electronic device 200. The application rendering subsystem may cause graphical representation of media presentation contents, which may include menu, icons, controls and the like, associated with the media presentation system 204.

The electronic device 200 may also include an encoder-decoder (codec) system 222. While it is illustrated that some hardware and software components of the codec system 222 are embodied as part of the architecture of the electronic device 200, it is to be understood and appreciated that the software components associated with the codec system 222 may form part of the media presentation system 204 which can come as an installable package. The codec system 222 may include a demultiplexer 224, audio and video processing modules 226, 228, temporary memory 230, audio and video decoders 232, 234, and audio and video rendering modules 236, 238. It is to be understood and appreciated that the illustrated hardware and/or software components of the electronic device 200 may vary according to a manufacturer's implementation of the electronic device 200. The software components of the media presentation system 204 may also vary according to a developer's implementation of the media presentation system 204.

The demultiplexer 224 may be a circuit that can be utilized for separating the audio and video signals 210-$a$, 210-$b$ from the media file 208 which may be received by the electronic device 200 from the source 206 as a single transport packet, source-coded signal. In accordance with one or more arrangements of the present disclosure and their embodiments, the source 206 of the media file 208 may be a local source or an external source. The local source may be the memory component 218 or a local storage device 242 of the electronic device 200.

Alternatively, the local source may be an external memory component (not illustrated) operatively coupled to the electronic device 200. The source 206 may also be a network storage device (not illustrated) or a web server computer (not illustrated) in operative communication with the electronic device 200 over any communication network which may be the Internet.

A communication interface 240 of the electronic device 200 may enable the electronic device 200 to receive the source-coded media file 208 from the source 206. The audio and video signals 210-$a$, 210-$b$ may be processed as input audio and video signals 210-$a$, 210-$b$ by the audio and video processing modules 226, 228, respectively, of the codec system 222.

The temporary memory 230 may be a region of the local storage device 242 that can be utilized for temporarily storing audio data associated with the audio signals 210-$a$ while they are being moved from the audio processing module 226 to the audio decoder 232. Similarly, the temporary memory 230 can be utilized for temporarily storing video data associated with the video signals 210-$b$ while they are being moved from the video processing module 228 to the video decoder 234. The temporary memory 230 may act as a data buffer implemented as a software that is necessary for moving the audio and video data associated with the audio and video signals 210-$a$, 210-$b$ at various transfer rates.

The audio decoder 232 may decode the audio signals 210-$a$ using any preset audio container format or any one or more modified audio container formats. Formats of the audio container that can be decoded through the codec system 222 may be based on, by way of examples, MP3, extensible music format (XMF), audio interchange file format (AIFF), and waveform audio file format (WAV). Similarly, the video decoder 234 may decode the video signals 210-$b$ using any preset video container format or any one or more modified video container formats. Formats of the video container that can be decoded through the codec system 222 may be based on, by way of examples, moving picture experts group 4 (MPEG4), Flash video, audio video interleaved (AVI), and windows media audio (WMA). It is also preferable that any one or both of the audio and video decoders 232, 234 may include low pass filters and high-pass filters for generating output audio and video signals 210-$a$, 210$b$, respectively, in decoded forms.

The output audio signals 210-$a$ may be transferred to the audio rendering module 236 which is arranged to render a digital representation of the audio signals 210-$a$ included in the media file 208 on an audio output component (e.g., a speaker) 244 of the electronic device 200. The output video signals 210-$b$ may be transferred to the video rendering module 238 which is arranged to render a digital representation of the video signals 210-$b$ included in the media file 208 on a video output component (e.g., display screen or monitor) 246 of the electronic device 200. The audio output component 244 and the display screen/monitor 246 are examples of the media output component 214 characterizing the audio and video output components 244, 246.

The outputting of the representations of the output audio and video signals 210-$a$, 210-$b$ on the audio and video output components 244, 246, respectively, may be performed when the media presentation system 204 is triggered to play the media file 208 from the source 206. The media presentation system 204 may include a playback switching module 248 which is preferably arranged to perform switching between audio-video mode of operation (wherein the output audio and video signals 210-$a$, 210-$b$ are outputted on the audio and video output components 244, 246, respectively), audio-only mode of operation (wherein only the output audio signals 210-$a$ are outputted on the audio output component 244 but both of the audio and video signals 210-$a$, 210-$b$ are being processed continuously), and video-only mode of operation (wherein only the output video signals 210-$b$ are outputted on the video output component 246 but both of the audio and video signals 210-$a$, 210-$b$ are being processed continuously). In any of these modes of operation of the media presentation system 204 and in the course of switching from one mode to another, both the audio and video signals 210-$a$, 210-$b$ are continuously processed (i.e., no single process is terminated).

At the electronic device 200, a control signal 250 may be generated by a request module 252 which receives an event (e.g., a UI) from the human user in relation to the media file 208 being played at the media presentation system 204. The control signal 250, which may include enabling and disabling signals, may be sent to the playback switching module 248 of the media presentation system 204. The playback switching module 248 may be arranged to switch between the audio-video mode, the audio-only mode, and the video-only mode in response to the control signal 250 it receives through the request module 252.

The processing components 216 are operable when executing the instructions to: firstly, receive, at the media presentation system 204, from the source 206 the media file 208; secondly, play, at the media presentation system 204, the media file 208 by processing the media signals 210; and thirdly, manipulate, at the media presentation system 204, the media container 212 depending on the operating state of at least one of the media presentation system 204 and the electronic device 200 while the media signals 210 are being processed, wherein the media file 208 preferably includes at least the media signals 210 which may include the media container 212 of a form suitable for representation on the media output component 214 of the electronic device 200. In other words, with reference to the signal processing system of the present disclosure, the media container 212 associated with the media signals 210 may be manipulated in accordance with one or more operating states of any one or both of the media presentation system 204 and the electronic device 200 without interrupting, disrupting, disabling, terminating, blocking, pausing, cancelling, or altering any logic associated with, any single process or combination of processes associated with the processing of the media signals 210.

In one preferred operation for the audio-video mode, the audio and video signals 210-a, 210-b associated with the media file 208 and originating from the source 206 may be received by the electronic device 200 through the communication interface 240. The media file 208 may be played at the media presentation system 204 upon receiving a first enabling signal associated with the control signal 250 from the request module 252. The request module 252 may be in communication with input components (not illustrated) of the electronic device 200, and may receive any suitable event, such as "select to play the media file" from one of the input components of the electronic device 200 which may include, by way of examples, a keyboard, a touchscreen, a voice sensor, and a motion sensor.

Under the audio-video mode, as is well-known, the audio and video signals 210-a, 210-b may be passed through the codec system 222, which may start from the demultiplexer 224 and conclude at the audio and video rendering modules 236, 238, in order to generate the representation of the audio signals 210-a on the audio output component 244 and as well as the representation of the video signals 210-b on the video output component 246. Under the audio-video mode of operation, multimedia attributes which are embedded in the audio and video signals 210-a, 210-b are intact (i.e., no attribute is removed or altered) after they are rendered on the audio and video output components 244, 246, respectively. The audio-video mode is usually the default operation for most media player applications which may characterize the media presentation system 204. In addition to the media container 212 which may be the audio and video containers, other multimedia attributes that can be utilized by the arrangements and various embodiments of the present disclosure may include, by way of examples and not by way of limitation, frame sizes, frame rates, pixel dimensions, level or degree of quantization, input channels, and output channels, among others.

Under the audio-only mode, the audio and video signals 210-a, 210-b may be passed through the codec system 222, which may start from the demultiplexer 224 and conclude at the audio and video rendering modules 236, 238. A second enabling signal associated with the control signal 250 from the request module 252 may be received by the media presentation system 204 for enabling the audio-only mode. Under this mode, only the audio signals 210-a are arranged to be represented on the audio output component 244 (i.e., the video signals 210-b are not rendered or represented on the video output component 246 but both of the audio and video signals 210-a, 210-b are being processed continuously). In accordance with any one or more arrangements of the present disclosure and any one or more of their embodiments, one of the multimedia attributes embedded in the video signals 210-b can be manipulated at any point during the processing of the audio and video signals 210-a, 210-b at the codec system 222.

For example, the media container 212 may be one video container which is preferably removed from the video signals while the audio and video signals 210-a, 210-b are being processed (i.e., without terminating any single process or combination of processes associated with any of the media presentation system 204, the codec system 222, and the OS 202 of the electronic device 200). Removal of the video container may be performed, by way of example, by the video processing module 228 of the codec system 222. Prior to the removal of the video container, the video processing module 228 may be arranged to stop the display of the contents of the video container associated with the video signals 210-b. Alternatively, the video container may be removed by the video rendering module 238 of the codec system 222. The audio-only mode provides continuous representation on the audio output component 244 of the audio signals associated with the media file 208 being played at the media presentation system 204 while the representation on the video output component 246 of the video signals associated with the same media file 208 is hidden, not viewable, or not being prepared to be viewable, on the video output component 246 which may be connected to, or may form an integral part of, the electronic device 200.

The audio-only mode is particularly useful in situations where a user prefers to listen to audio aspects of certain videos, such as video materials, specifically made for online courses and seminars, and where a user is not interested in the display aspects of such videos. The audio-only mode may also be preferred in situations where users are too occupied with real-world tasks, such as driving, cooking, jogging, bike riding, paying bills, and the like, which can prevent them from shifting their focus to the display aspects of videos.

Under the video-only mode, the audio and video signals 210-a, 210-b may be passed through the codec system 222, which may start from the demultiplexer 224 and conclude at the audio and video rendering modules 236, 238. A third enabling signal associated with the control signal 250 from the request module 252 may be received by the media presentation system 204 for enabling the video-only mode. Under this mode, only the video signals are arranged to be rendered or represented, particularly on the video output component 246 (i.e., the audio signals are not represented on the audio output component 244 but both of the audio and video signals 210-a, 210-b are being processed continuously). In accordance with any one or more arrangements of the present disclosure and any one or more of their embodiments, one of the multimedia attributes embedded in the audio signals 210-a can be manipulated at any point during the processing of the audio and video signals 210-a, 210-b at the codec system 222.

For example, the media container 212 may be one audio container which is preferably removed from the audio signals while the audio and video signals are being processed (i.e., without terminating any single process or combination of processes associated with any of the media presentation system 204, the codec system 222, and the OS 202 of the electronic device 200). Removal of the audio container may be performed, by way of example, by the audio processing module 226 of the codec system 222. Prior to the removal of the audio container, the audio processing module 226 may be arranged to stop the playing of the contents of the audio container associated with the audio signals 210-a. Alternatively, the audio container may be removed by the audio rendering module 236 of the codec system 222. The video-only mode provides continuous representation on the video output component 246 of the video signals 210-*b* associated with the media file 208 being played at the media presentation system 204 while the representation on the audio output component 244 of the audio signals 210-*a* associated with the same media file 208 is hidden, not audible, or not being prepared to be audible, on the audio output component 244 which may be connected to, or may form an integral part of, the electronic device 200.

The video-only mode is particularly useful in situations where audio aspects of certain videos are not of interest. Such situation may be evident in the advertising industry where advertisement billboards or computer monitors attachable to vehicles and buildings and where in-app advertisements frames commonly found in mobile devices do not require audio aspects of videos to be played. Video-based advertising materials are made to target the public at large which normally do not pay attention to their audio aspects. In which case, playing the video aspects of video materials is highly appropriate and, on the contrary, their audio aspects may be unnecessary as in most cases.

As described herein, use of each of the audio-video mode, the audio-only mode, and the video-only mode has their own advantages on the user's end. Switching from the audio-video mode to any one of the audio-only mode and the video-only mode, however, has also technical benefits and advantages. For one, only one of the audio and video contents is generally represented on the media output component 214. This thereby minimizes use of system resources of the electronic device 200 when processing media signals 210 based on the operating state-dependent handling of the multimedia attributes which include the media container 212 (i.e., the audio and video containers), and prevents significant processing delay that can impede and/or interfere with an optimal responsive performance of the electronic device 200 running the media presentation system 204.

Figure 3:
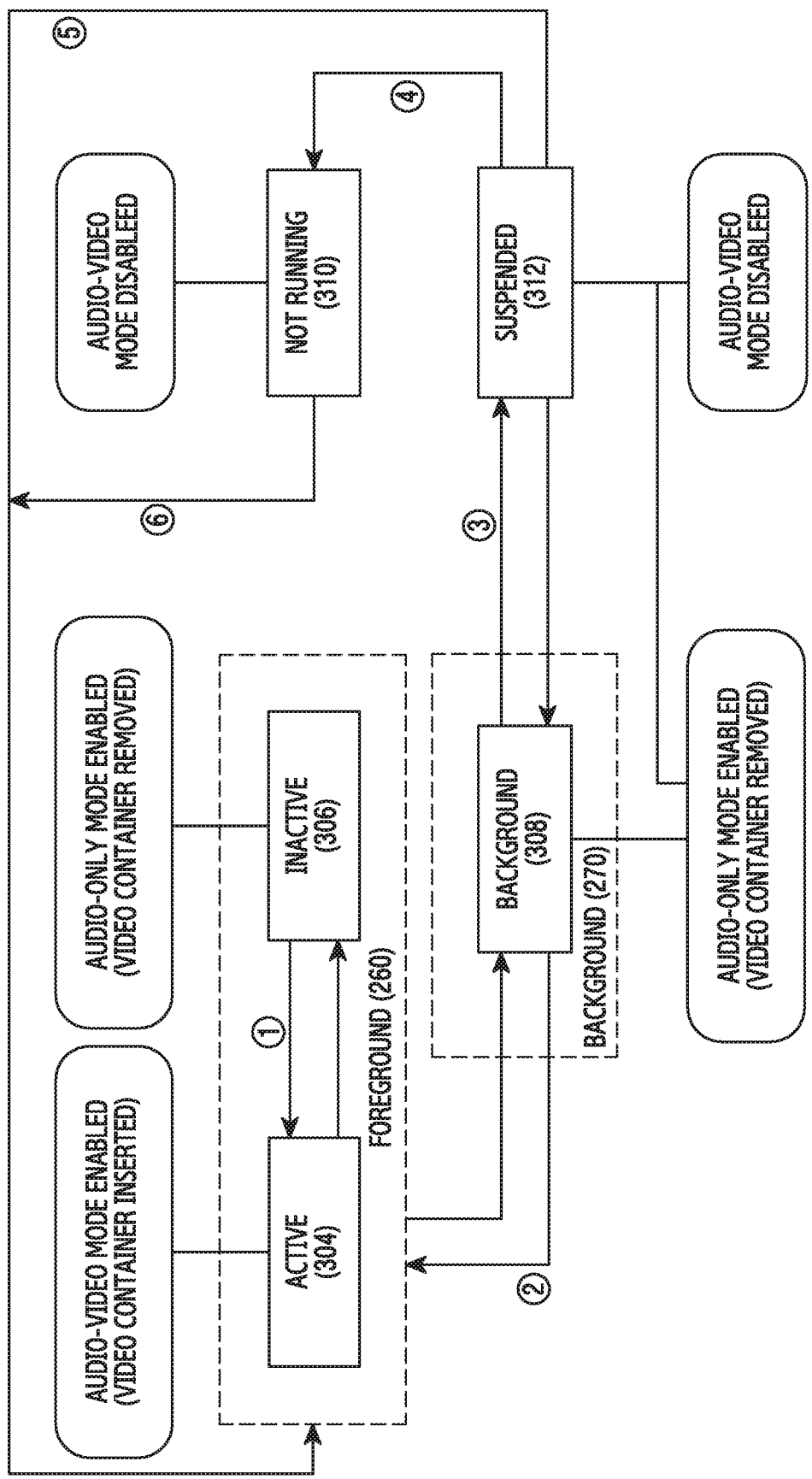
FIG. 3 is a state transition diagram of a state transition according to an embodiment of the present disclosure.

FIG. 3 illustrates a state transition diagram of a state transition according to an embodiment of the present disclosure.

Referring to FIG. 3, in accordance with one or more of arrangements of the present disclosure and their embodiments, the operating states of the media presentation system 204 and the electronic device 200, in whole or in part, and possible transitions between these states, as shown in the transition diagram of FIG. 3, may affect the manner by which the media container 212, which may be an audio container or a video container, can be manipulated to effect the audio-video, the audio-only, and the video-only modes of operation for processing the media signals 210. Primarily, an application, such as the one characterizing the media presentation system 204 playing the media file 208 may be placed in a foreground 260 or in a background 270 of the OS 202 of the electronic device 200. As is well known in field of computer science, the foreground 260 of the OS 202 of the electronic device 200 may be a window for displaying an application, a visible application, or an active application. As is well known also, the background 270 of the OS 202 of the electronic device 200 may be an area of the display screen in graphical unit interfaces behind a window in the foreground.

The media presentation system 204 placed in the foreground 260 of the OS 202 of the electronic device 200 may be in an active state 304 or in an inactive state 306. Depending on the configuration of the OS 202, the active and inactive states 304, 306 may have different definitions. In the context of the present disclosure, the active state 304 may be defined as when the display operation associated with the media output component 214, or with the video output component 246 in particular, of the electronic device 200 is activated, when the media presentation system 204 is displayed on the video output component 246 and its codes are running, and when the media presentation system 204 responds to events (e.g., clicking to play and pause a playing video file) and/or has no interruptions (e.g., phone calls). The inactive state 306 in the foreground 260, on the other hand, may be defined as when the display operation associated with the video output component 246 of the electronic device 200 is deactivated, when the media presentation system 204 is not displayed on the video output component 246 and its codes are not running, and when the media presentation system 204 does not respond to events and/or has interruptions.

The media presentation system 204 placed in the background 270 of OS 202 of the electronic device 200 may be in a background state 308. The background state 308 may be defined as when the display operation associated with the video output component 246 of the electronic device 200 is either activated or deactivated, when the media presentation system 204 is not displayed on the video output component 246 but its codes are running, and when the media presentation system 204 does not respond to events and/or has no interruptions.

In addition to the active and inactive states 304, 306 in the foreground 260 and the background state 308 in the background 270 of the OS 202 of the electronic device 200, some other possible states through which the media presentation system 204 may undergo may include the "not running" state 310 and the suspended state 312. The "not running" state 310, as is well known, is characterized as when the media presentation system 204 is not executed on the electronic device 200. Depending on the configuration of any of the OS 202 and media presentation system 204, the suspended state 312, on the other hand, may have varying definitions. For example, the suspended state 312 may be defined as when the display operation associated with the video output component 246 of the electronic device 200 is deactivated and when the media presentation system 204 is not displayed on the video output component 246 and its codes are not running; hence, no event nor interruption may take place. Alternatively, the suspended state 312 may be defined as merely when the display operation associated with the video output component 246 is deactivated (i.e., the electronic device 200 is switched to sleep mode as is well known) but the media presentation system 204 remains running in the background 270 of the OS 202 of the electronic device 200.

In accordance with one or more arrangements of the present disclosure and their embodiments, the operating state of any one or both of the media presentation system 204 and the electronic device 200, in whole or in part, is generally determined based on whether the media presentation system 204 is caused by the electronic device 200 to be placed in the foreground 260 or in the background 270 of the OS 202. The manipulating operation may comprise removing the video container from the video signals 210-*b* being processed when the media presentation system 204 is caused by the electronic device 200 to be placed in the background 270 of the OS 202. The manipulating operation may further comprise inserting the video container back into the video signals 210-*b* when the media presentation system 204 in the background 270 is caused by the electronic device 200 to be placed back in the foreground 260 of the OS 202, depending on the state, active state 304 or inactive state 306, of the media presentation system 204 in the foreground 260.

In accordance with one or more arrangements of the present disclosure and their embodiments, such operating state may also be determined when a display operation associated with the video output component 246 is caused by the electronic device 200 to be activated or otherwise deactivated. The manipulating operation may comprise removing the video container from the video signals 210-*b* when the display operation is caused by the electronic device 200 to be activated. Under this determination, the manipulating operation may comprise inserting the video container back into the video signals 210-*b* when the deactivated display operation is caused by the electronic device 200 to be activated or reactivated.

In accordance with one or more arrangements of the present disclosure and their embodiments, the audio signals 210-*a* and the video signals 210-*b* to which the video container is inserted back are preferably synchronized. Further, and still in accordance with one or more arrangements of the present disclosure and their embodiments, it is preferable that the media file 208 is continuously received from the source 206 and passed through the codec system 222 for continuous and/or uninterrupted processing of the audio and video signals 210-*a*, 210-*b* unless otherwise a human intervention forcing it to stop at any point is received by the media presentation system 204. This processing operation may comprise decoding of the audio and video signals 210-*a*, 210-*b* into audio and video signal frames, respectively.

Figure 5:
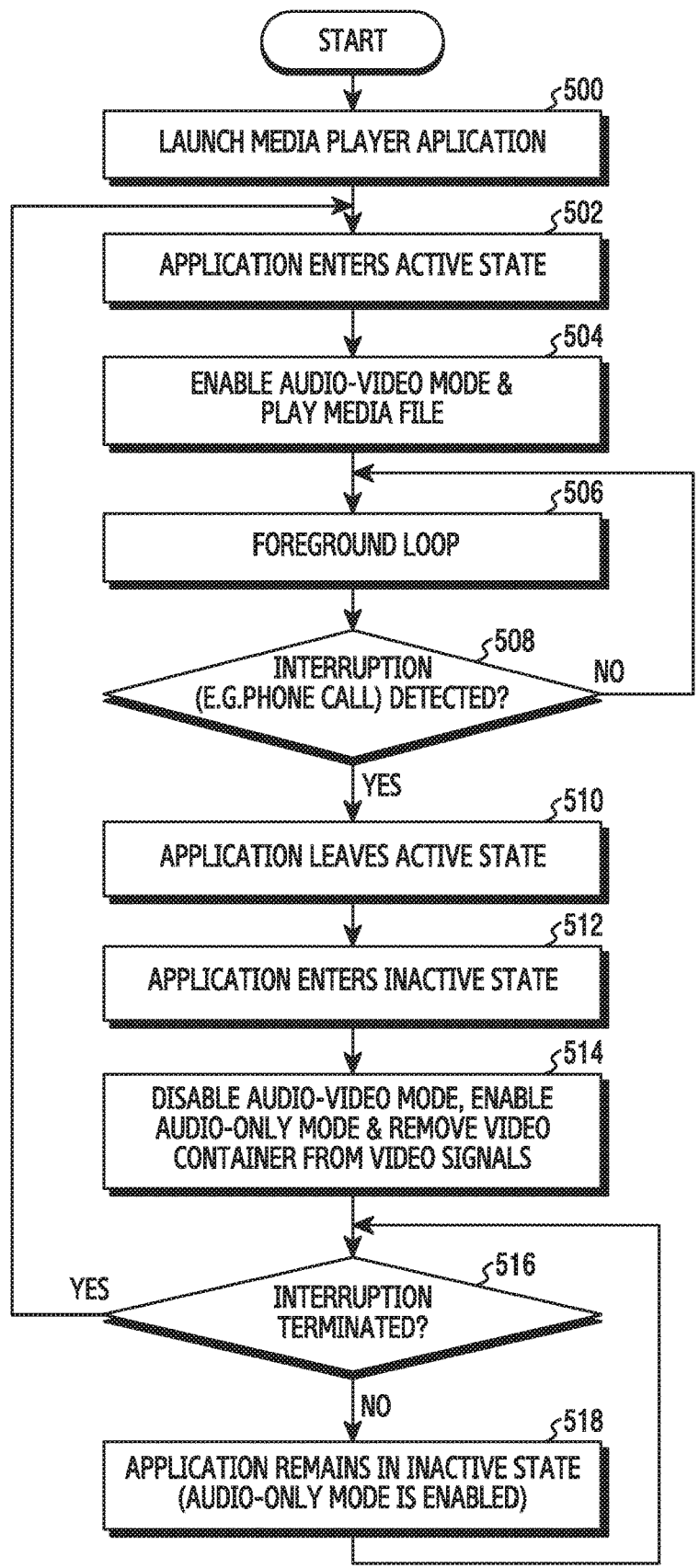
FIG. 5 is a flow diagram of a transition from one state to another according to an embodiment of the present disclosure.

A first possible state transition through which the media presentation system 204 may undergo is between the active state 304 and the inactive state 306 in the foreground 260 of the OS 202 of the electronic device, the example illustration of which is shown in the flow diagram of FIG. 5. From the active state 304 to the inactive state 306, the operation of the media presentation system 204 may be paused. From the inactive state 306 to the active state 304, the operation of the media presentation system 204 may be resumed. In accordance with the arrangements and various embodiments of the present disclosure, switching to the active state 304 in the foreground 260 may require the audio-video mode to be enabled wherein the video container may be present and/or inserted to the video signals 210-*b*, and switching to the inactive state 306 may require the audio-only mode to be enabled wherein display of the video container may be stopped and the video container may be removed from the video signals 210-*b*.

A second possible state transition through which the media presentation system 204 may undergo is between any of the active and inactive states 304, 306 in the foreground 260 and the background state 308 in the background 270. The example illustration of the transition of the media presentation system 204 between the active state 304 in the foreground 260 and the background state 308 in the background 270, as being one of many possible implementations, is shown in the flow diagram of FIG. 6.

Switching from the active state 304 in the foreground 260 to the background state 308 in the background 270 of the OS 202 of the electronic device 200 may cause the audio-only mode to be enabled wherein the video container is removed from the video signals 210-*b*. Switching from the background state 308 in the background 270 to the active state 304 in the foreground 260 may cause the audio-video mode to enabled and the audio-only mode to be disabled. Switching between the inactive state 306 in the foreground 260 and the background state 308 in the foreground 260 may not cause any change to the readily enabled audio-only modes of operation.

When audio-only mode is activated, the video container is removed and placed in the temporary memory for retrieval on a later instance. The video container will be used when the media player application enters the active state 304. When the media player application enters active state 304, the video container will be retrieved from memory, and audio-video mode is activated.

According to an embodiment of the present disclosure, the media player application processes the audio signal on a different process from the video signal. The audio signal processing will be continued even though the video container is removed. This ensures continuous playback of the audio signal even if the media player application enters the suspended state. According to another embodiment of the present disclosure, modifying header fields of the video signals may be needed.

A third possible state transition through which the media presentation system 204 may undergo is between the background state 308 in the background 270 and the suspended state 312 which can have various definitions. If the suspended state 312 is defined as when the display operation associated with the video output component 246 is caused by the electronic device 200 to be deactivated (i.e., the video output component 246 of the electronic device 200 is turned off) but the media presentation system 204 is running in the background 270, then the audio-only mode may be enabled wherein the video container is removed from the video signals 210-*b*. If the suspended state 312 is defined as when the codes associated with the media presentation system 204 is not running, then the audio-video mode may be disabled.

A fourth possible state transition through which the media presentation system 204 may be undergo is from the suspended state 312 to the "not running" state 310, wherein the media presentation system 204 is not running on the electronic device 200. The audio-video mode may be disabled in the fourth transition from the suspended state 312 to the "not running" state 310.

A fifth possible state transition through which the media presentation system 204 may undergo is from the suspended state 312 to any of the active and inactive states 304, 306 in the foreground 260, wherein the media presentation system 204 can be launched. From the suspended state 312 to the active state 304 in the foreground 260, the audio-video mode may be enabled wherein the video container is present and/or inserted back into the video signals. From the suspended state 312 to the inactive state 306 in the foreground, the audio-only mode may remain enabled wherein the video container is still removed from the video signals.

A sixth possible state transition through which the media presentation system 204 may undergo is from the "not running" state 310 to the any of the active and inactive states 304, 306 in the foreground 260. From the "not running" state 310 to the active state 304 in the foreground 260, the audio-video mode may be enabled wherein video container is inserted back into the video signals. From the "not running" state 310 to the inactive state 306 in the foreground 260, the audio-only mode may be enabled wherein the video container is removed from the video signals 210-*b*.

It is to be understood and appreciated that the six forms of transition of the media presentation system 204 as described herein are illustrative only and may be affected based at least in part on the manner by which the electronic device 200 is operated. For example, if the electronic device 200 is automatically set to be put to sleep mode by a user, and when such sleep mode takes place against the electronic device 200, the media presentation system 204 that may be running on it may consequently undergo switching from, for example, the background state 308 in the background 270 to the suspended state 312 of the OS 202.

In accordance with one or more arrangements and the various embodiments of the present disclosure, the operating state on which the manipulation of the video container (i.e., removed from or inserted back into the video signals) may depend is any operating state that allows manipulation of the media container 212, or of the video container in particular, through an object. It is preferable that this object is a control object selectable from the media output component 214, or from video output component 246 in particular, the example illustration of which is partly described in the flow diagram of FIG. 7 and the graphical representation of which is partly shown in the use-case diagram of FIG. 11.

Figure 4:
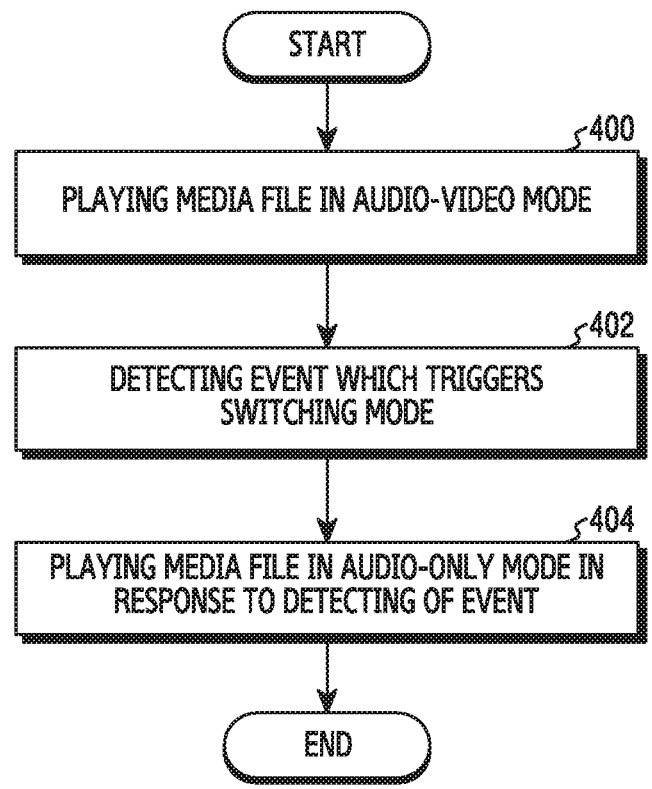
FIG. 4 is a flow diagram of a computer-implemented method for playing a media file according to an embodiment of the present disclosure.

FIG. 4 is a flow diagram of a computer-implemented method for playing a media file in an electronic device according to an embodiment of the disclosure.

Referring to FIG. 4, at operation 400, the electronic device 200 plays the media file in an audio-video mode. The media signals comprise audio signals and video signals. The media signals may comprise at least one media container. According to an embodiment of the present disclosure, the media container may comprise a video container. The audio-video mode allows to play both audio and video contents of the media file. It means that the electronic device 200 may play the video contents with the audio contents in the audio-video mode.

At operation 402, the electronic device 200 detects an event which triggers switching a mode to an audio-only mode. According to an embodiment of the present disclosure, the event which triggers changing the mode of playing the media file may comprise at least one of an interruption including a phone call, a switch to another application when executing a media playing application, a change of battery level of the electronic device 200 (i.e., the remaining battery level is lower than a certain threshold) an analysis of images of the media file. According to another embodiment of the present disclosure, audio-only mode can be determined based on an analysis of a change of images constituting video contents. If there are few changes of the images of the video contents, the audio-only mode can be activated to reduce the consumption of resources of the electronic device 200.

At operation 404, the electronic device 200 plays the media file in the audio-only mode in response to the event which triggers switching a mode to an audio-only mode. The audio-only mode allows to play only the audio contents of the media file. It means that the electronic device 200 may play the audio contents without the video contents in the audio-only mode.

FIG. 5 illustrates a flow diagram of an example transition from one state to another according to an embodiment of the present disclosure.

Referring to FIG. 5 in relation to the schematic block diagram of FIG. 2 and the transition diagram of FIG. 3, a first transition loop is illustrated between the active state 304 and the inactive state 306 of media player application characterizing the media presentation system 204 in the foreground 260 of the OS 202 of the electronic device 200. Here, in one instance, the media player application may be in the active state 304 in the foreground 260 when it is running on the OS 202, viewable at the video output component 246 of the electronic device 200, responding to events (e.g., player control selection through clicking), and/ or has no interruption. In another instance, the media player application may be in the inactive state 306 in the foreground 260 when it is running on the OS 202, viewable at the video output component 246 of the electronic device 200, and not responding to events, such as click events, and/or has interruption.

The first transition loop is an example illustration only and may always change depending on the configuration of any of the media player application and the OS 202 of the electronic device 200.

At operation 500, the media player application is launched on the electronic device 200.

At operation 502, the media player application enters the active state 304 in the foreground 260 of the OS 202 of the electronic device 200.

At operation 504, the audio-video mode as described herein may be enabled and the media file 208 containing the audio and video signals 210-a, 210-b is played at the media player application. While playing the media file 208 with the audio-video mode being enabled, the media player application may stay in the foreground loop, as shown in operation 506.

If an interruption, such a phone call, is detected as decision operation 508 while the media file 208 is being played at the media player application, the transition advances to operation 510 wherein the media player application leaves the active state 304, and then to operation 512 wherein the media player application enters the inactive state 306 in the foreground 260 of the OS 202 of the electronic device 200. Otherwise, if no interruption is detected at decision operation 508, the transition loop may move back to the previous operation 506 wherein the media player application stays in the active state 304 in the foreground 260. Leaving the active state 304 and entering the inactive state 306 at previous operations 510 and 512 may cause the transition loop to move to operation 514 wherein the audio-video mode is disabled while the audio-only mode as described herein is enabled. Enabling the audio-only mode may cause the removal of the video container from the media signals 210 and particularly on the video signals 210-b. This enables a user to play audio contents of the file without video while she is engaged in the phone call or any such other forms of interruption being experienced by the media player application.

While the interruption is continued to be detected at decision operation 516, the media player application may remain in the inactive state wherein the audio-only mode is enabled, as shown in operation 518. Once the interruption is terminated (e.g., the phone call has been ended), the first transition loop may be caused to move back to operation 502 wherein the media player application re-enters the active state 304 from the inactive state 306. Generally, such interruption can cause the transition of the media player application from the active state 304 to the inactive state 306, and termination of such interruption can cause the transition of the media player application from the inactive state 306 to the active state 304.

Figure 6:
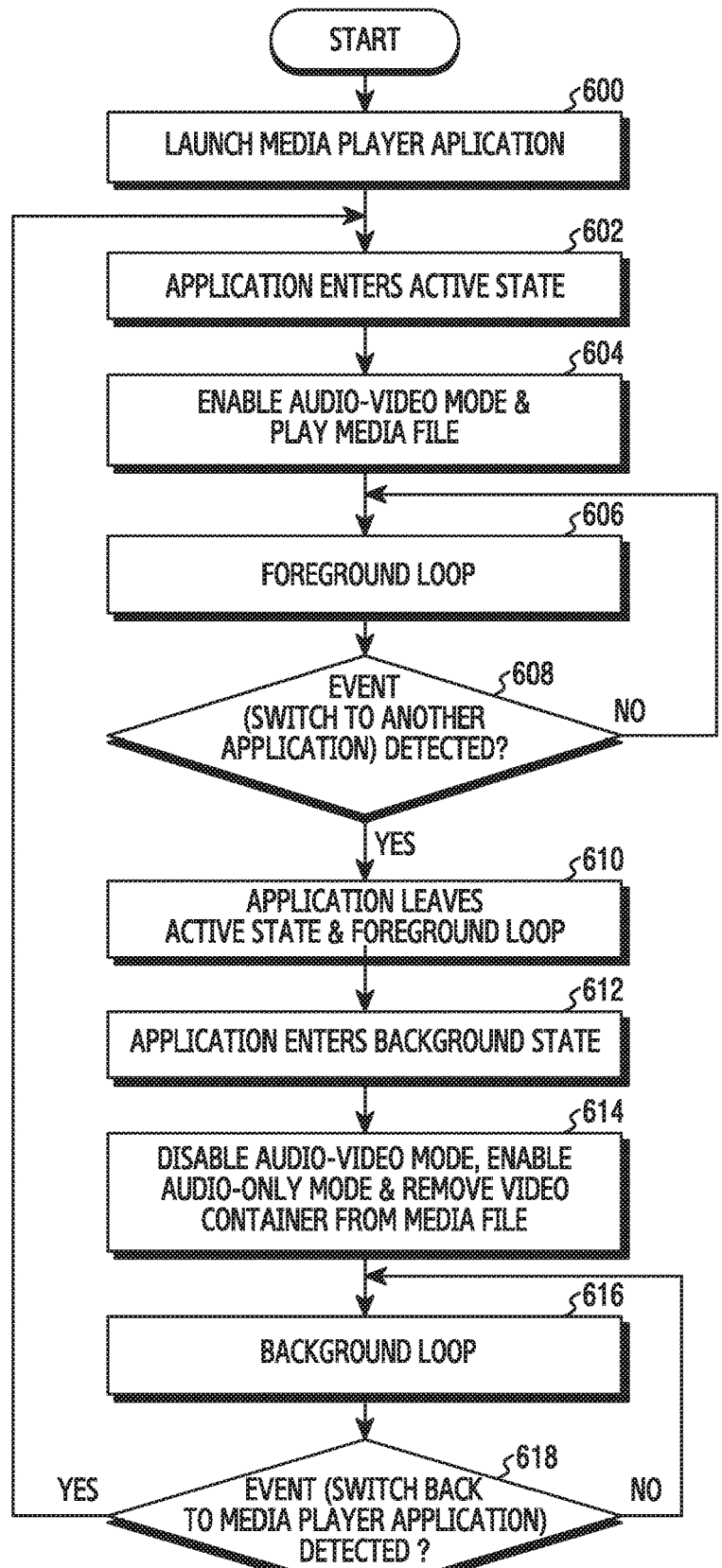
FIG. 6 is a flow diagram of a transition from one state to another according to an embodiment of the present disclosure.

FIG. 6 illustrates a flow diagram of a transition from one state to another according to an embodiment of the present disclosure.

Referring to FIG. 6 in relation to the schematic block diagram of FIG. 2 and the transition diagram of FIG. 3, a second transition loop is illustrated between the active state in the foreground 260 of the OS 202 of the electronic device 200 and the background state 308 of media player application characterizing the media presentation system 204 in the background 270 of the OS 202 of the electronic device 200.

Here, in one instance, the media player application may be in the background state 308 in the background 270 when it is running on the OS 202 but not viewable at the video output component 246 of the electronic device 200.

The second transition loop is an example illustration only and may always change depending on the configuration of any of the media player application and the OS 202 of the electronic device 200. At operation 600, the media player application is launched on the electronic device 200. At operation 602, the media player application enters the active state 304 in the foreground 260 of the OS 202 of the electronic device. At operation 604, the audio-video mode as described herein may be enabled and the media file 208 containing the audio and video signals 210-$a$, 210-$b$ is played at the media player application. While playing the media file 208 with the audio-video mode being enabled, the media player application may stay in the foreground loop, as shown in operation 606.

While in the foreground loop as shown in the operation 606, the media player application may be arranged to actively detect whether a first event has taken place, as shown in decision operation 608. The first event may be, for example, switching to another application, such as an e-mail or calendar application (i.e., distinct from the media player application). According to an embodiment of the present disclosure, the first event may comprise at least one of an interruption including a phone call, a switch to another application when executing the media player application, a change of battery level of the electronic device 200 (i.e., the remaining battery level is lower than a certain threshold) and an analysis of images of the media file. According to another embodiment of the present disclosure, audio-only mode can be activated based on an analysis of a change of images constituting video contents. If there are few changes of the images of the video contents, the audio-only mode can be activated to reduce the consumption of resources of the electronic device 200. While the first event is not detected in the decision operation 608, the media player application remains in the foreground loop wherein the media file 208 is being played with the audio-video mode being enabled. Once the example first event (i.e., switching event) takes place as detected in the decision operation 608, the second transition loop moves to operation 610 wherein the media player application leaves the active state 304 in the foreground 260 and, consequently, to operation 612 wherein the media player application enters the background state 308 in the background 270.

In the background state 308, the audio-video mode is disabled, the audio-only mode is enabled, and the media player application stays in the background loop as shown in subsequent operations 614 and 616, respectively. The enabling of the audio-only mode causes the video container associated with the video signals 210-$b$ to be removed from the media file 208. While the media player application stays in the background loop, a second event is monitored for detection in decision operation 618. The second event may be characterized by switching back to the media player application wherein an active window containing the media player application is displayed on the video output component 246 of the electronic device. If the second event is detected in the decision operation 618, the second transition loop moves back to the previous operation 602 wherein the media player application re-enters the active state 304 in the foreground 260. Otherwise, the transition loop may move back to the previous operation 616 wherein the media player application stays in the background state 308 in the background 270 of the OS 202 of the electronic device 200 running the media player application.

It is to be understood and appreciated that the first transition loop (i.e., between the inactive and active states 304, 306 in the foreground 260) and the second transition loop (i.e., between the active state 304 in the foreground 260 and the background state 308 in the background 270) are merely illustrative for the purpose of showing how example state transitions can affect the enabling and disabling of the herein described audio-video and audio-only modes. To some extent understood, the enabling and disabling of the video-only mode, although not illustrated in relation to state transitions of the media player application against the OS 202 of the electronic device 200, may also be affected by such state transitions.

Figure 7:
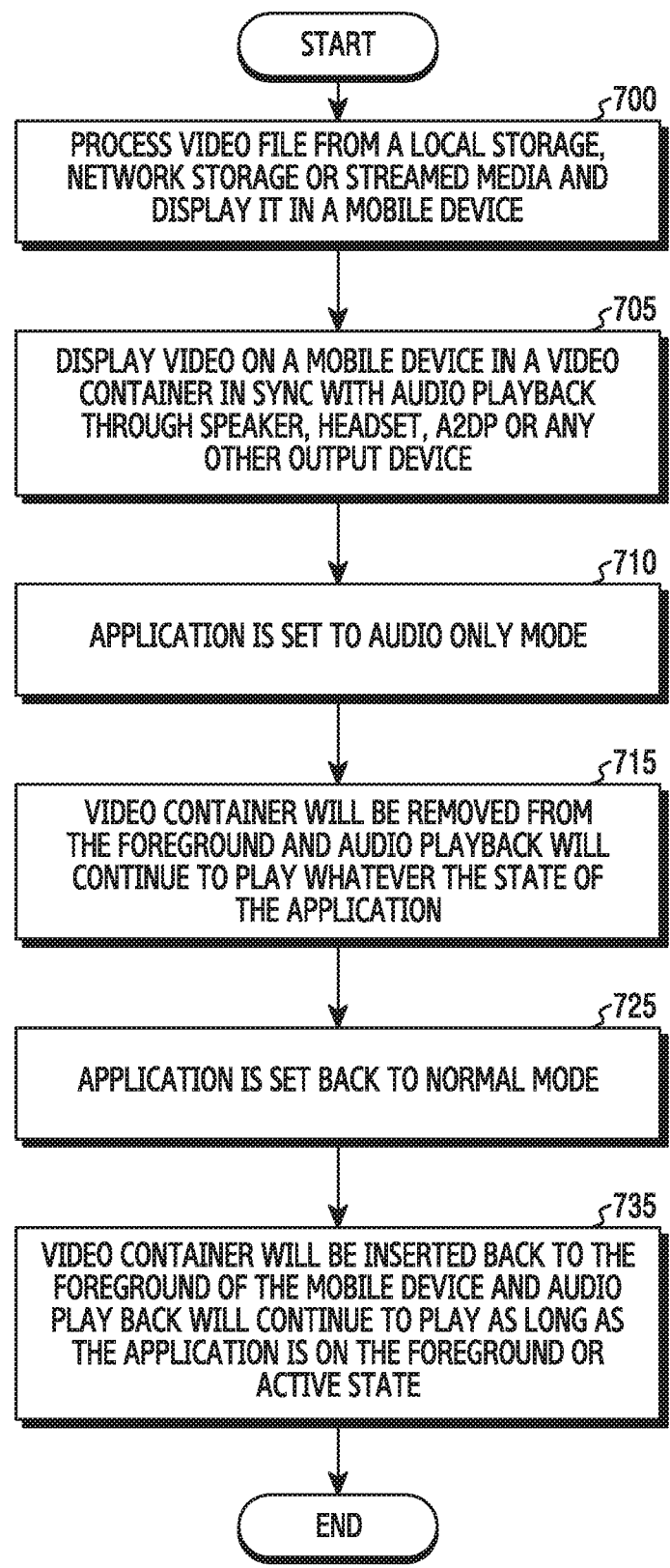
FIGS. 7, 8, 9, and 10 are flow diagrams of computer-implemented processes according to various embodiments of the present disclosure.
Figure 8:
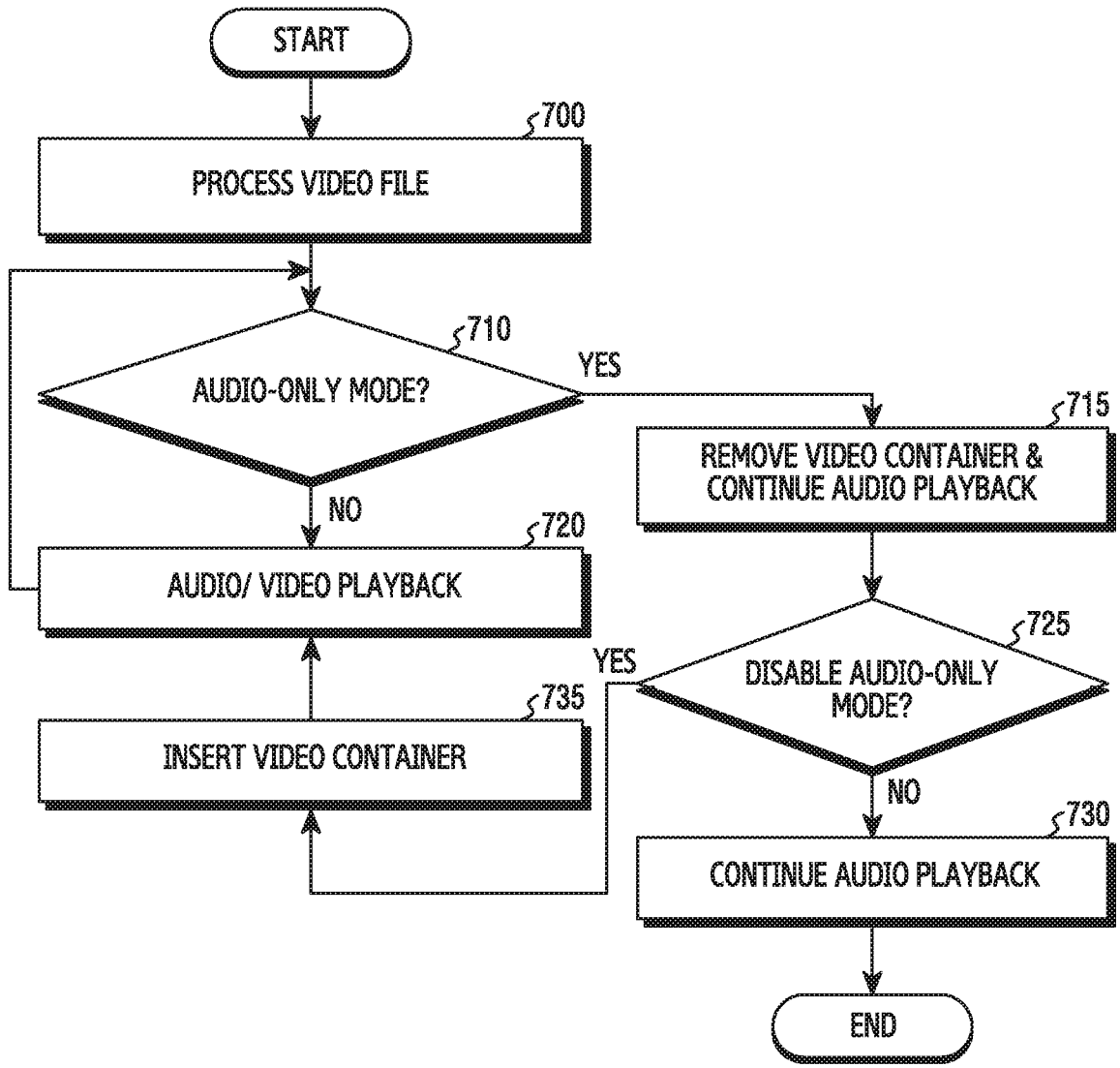

FIGS. 7 and 8 illustrate flow diagrams of a transition from one state to another according to various embodiments of the present disclosure.

Referring to FIGS. 7 and 8 described in relation to the schematic diagram of FIG. 2, when the electronic device 200, like mobile phone, tablet, laptop, PDA, processes the media file 208, which may be a video file, from the local storage device 242 at operation 700 and displays the media file 208 on the electronic device 200 causing the media file 208 to be displayed in the video container in sync with an audio playback associated with media file 208 at operation 705, the user may activate or enable or set the media player application to the audio-only mode of operation at operation 710. This activation may be effected by a button (represented in the use-case diagram of FIG. 11) that can be used to control the player as well as returning to the same video player. The button "B" may represent the control object through which the media container can be manipulated depending on whether the operating state of the video player application permits manipulation.

When the user causes the enablement of the audio-only mode, the display of the video container on the electronic device 200 is preferably stopped without terminating the video signals by way of removing the video container from the foreground 260 and continuing audio playback at any operating state of the application at operation 715. On the other hand, when the user decides not to activate the audio-only mode, the audio and video continue to playback at operation 720 in the video container. However, when the audio-only mode is activated, the video container is removed in the foreground 260 and the audio continues to play until the user decides to deactivate the audio-only mode or the application is set back to the normal mode at operation 725. Further, it should be noted that, when the user continues listening to the audio under the audio-only mode, it does not consume the local computational resources of his or her own playback device when the media player application that runs on it enters from one state to another (e.g., from foreground 260 to background 270). If the user decides not to disable the audio-only mode, the audio continuously plays at operation 730. However, if the user decides to disable the audio-only mode and set back the application in normal mode, the video container may be caused to be inserted back into the video signals 210-$b$ by electronic device at operation 735 without reinitializing processes including decoding and other media playing processes, and the audio playback is continued when the application is in active state with the video and audio being played and synchronized at operation 720 with the audio and video signals do not interfere with one another when the video view is displayed back on electronic device 200 upon switching of the media player application running on the electronic device 200 from one state to another so as to prevent significant delays in processing.

Figure 9:
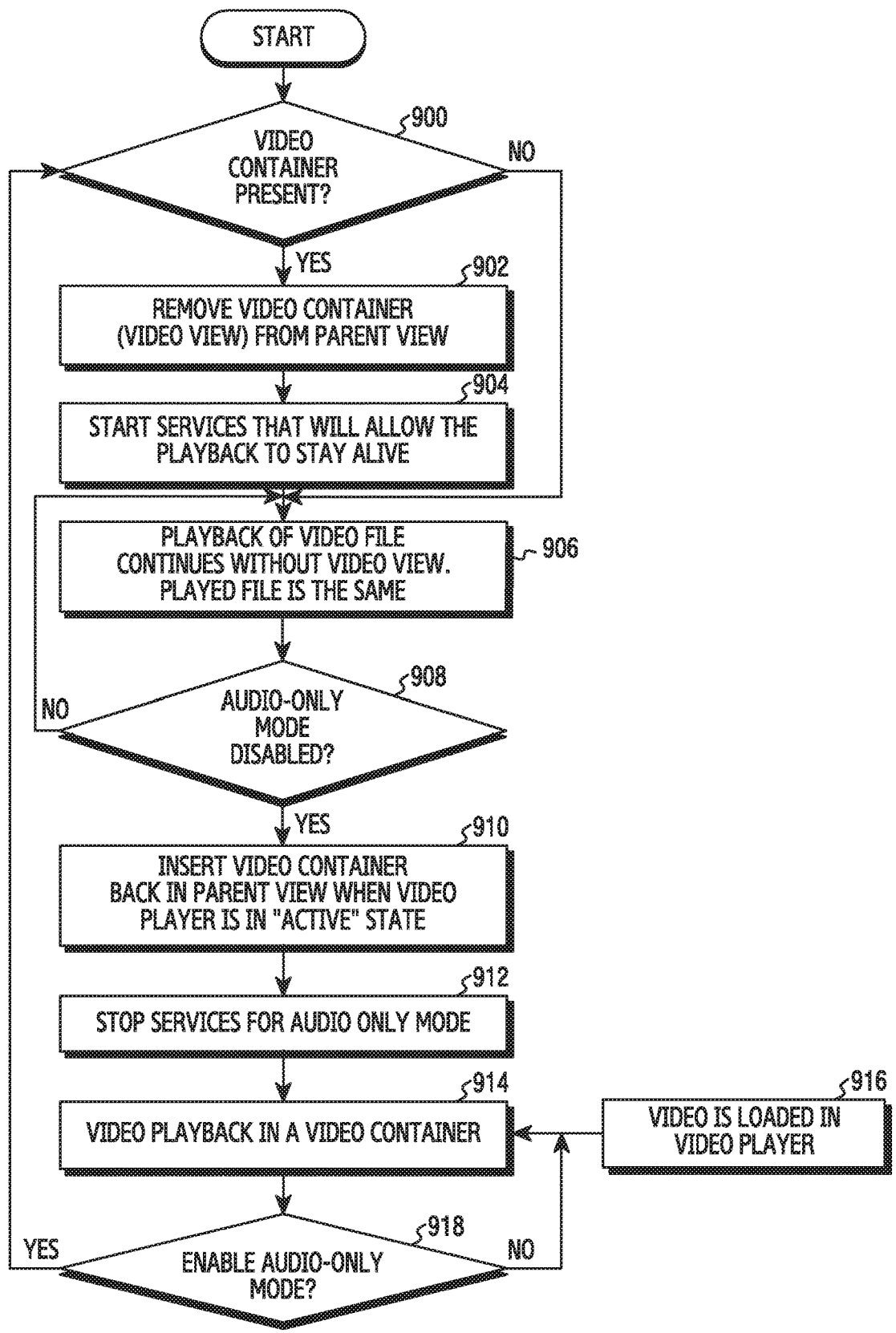

FIG. 9 illustrates a flow diagram of a transition from one state to another according to an embodiment of the present disclosure.

Referring to FIG. 9, which is described in relation to the schematic diagram of FIG. 2, the electronic device 200 also detects the absence or presence of the video container in the media signals 210 at decision operation 900. If there is such video container detected, the display of the video container is caused by the electronic device 200 to stop without terminating the video signals 210-*b* by way of removing the video container from the foreground 260 and continuing the audio playback at any state of the application at operation 902. After the removal of the video container, the electronic device 200 continuously plays the audio at operation 904 and then the electronic device 200 continuously plays the video file without video view or the application playing the video file is set in the background at operation 906. However, if there is no such video container that is detected in the decision operation 900, the electronic device 200 continuously plays the video file without video view or application playing the video file is set in the background 270 at operation 906. While the audio-only mode is in operation at decision operation 908, the playback of the video file may be continued at operation 908. If the user decides to cause disablement of the audio-only mode and setting back of the application to normal mode, the video container may be caused by the electronic device 200 to be inserted back into the video signals bring processed by the electronic device 200 at operation 910 without reinitializing processes including decoding and other media playing processes and with the video player in active state, wherein the video is set back to the foreground without delay and synchronized with the audio being continuously played and, at the same time, services associated with the audio-only mode is stopped at operation 912. Consequently, video playback in the video container is resumed at operation 914 wherein the video is loaded in the media player application at operation 916. After which, enabling of the audio-only mode may be actively monitored at decision operation 918. While the audio-only mode is not detected at decision operation 918, the video playback in the video container may continue at operation 914; otherwise, determining whether the video container is presented in the video playback may be performed at operation 900.

Figure 10:
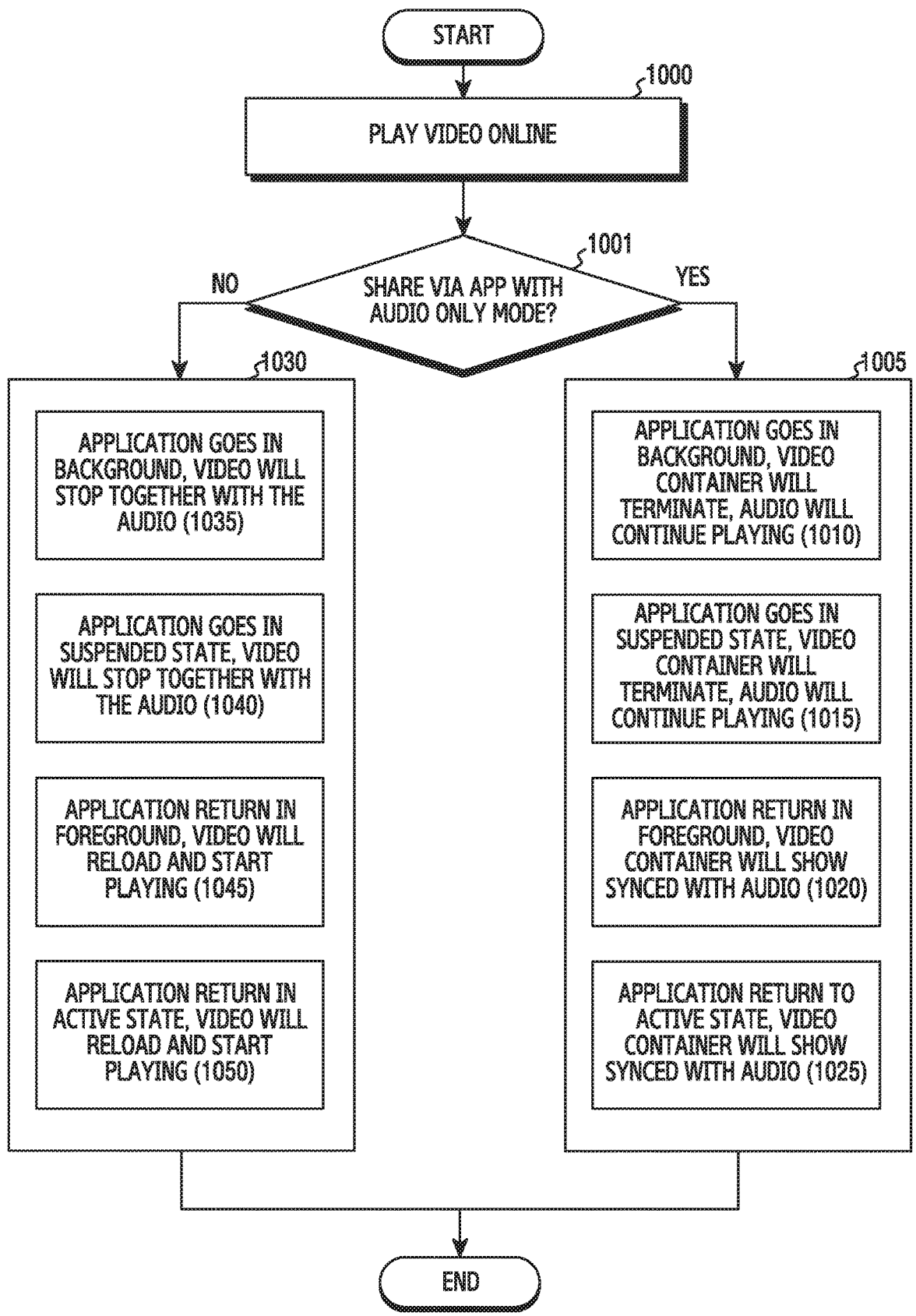

FIG. 10 illustrates a flow diagram of a transition from one state to another according to an embodiment of the present disclosure.

Referring to FIG. 10, described in relation to the schematic diagram of FIG. 2, when a media file 208 is fetched from a streaming online site at operation 1000, the online video can be shared via an application stored in the electronic device 200 with an audio-only mode of operation. As may be determined at decision operation 1001, if there is such audio-only mode (group 1005), the application goes in background and the video container will terminate, then the audio will continue playing at operation 1010. Further, the application goes in suspended state while the video container is terminated and the audio will continue playing at operation 1015. When the user decides to terminate the audio-only mode, the application returns to foreground 260 and the video container will show synchronized with audio at operation 1020. As such, the application return to active state and the video container will show in the foreground synchronized with the corresponding audio at operation 1025. On the other hand, if there is not such audio-only mode (group 1030), the application goes in background and the video will stop together with the audio at operation 1035. At this state the application goes in suspended state and the video will stop together with the audio at operation 1040. Further, the application will return to foreground with the video being reloaded and start playing at operation 1045 and as such, the application returns to active state with the video being reloaded and start playing at operation 1050.

Figure 11:
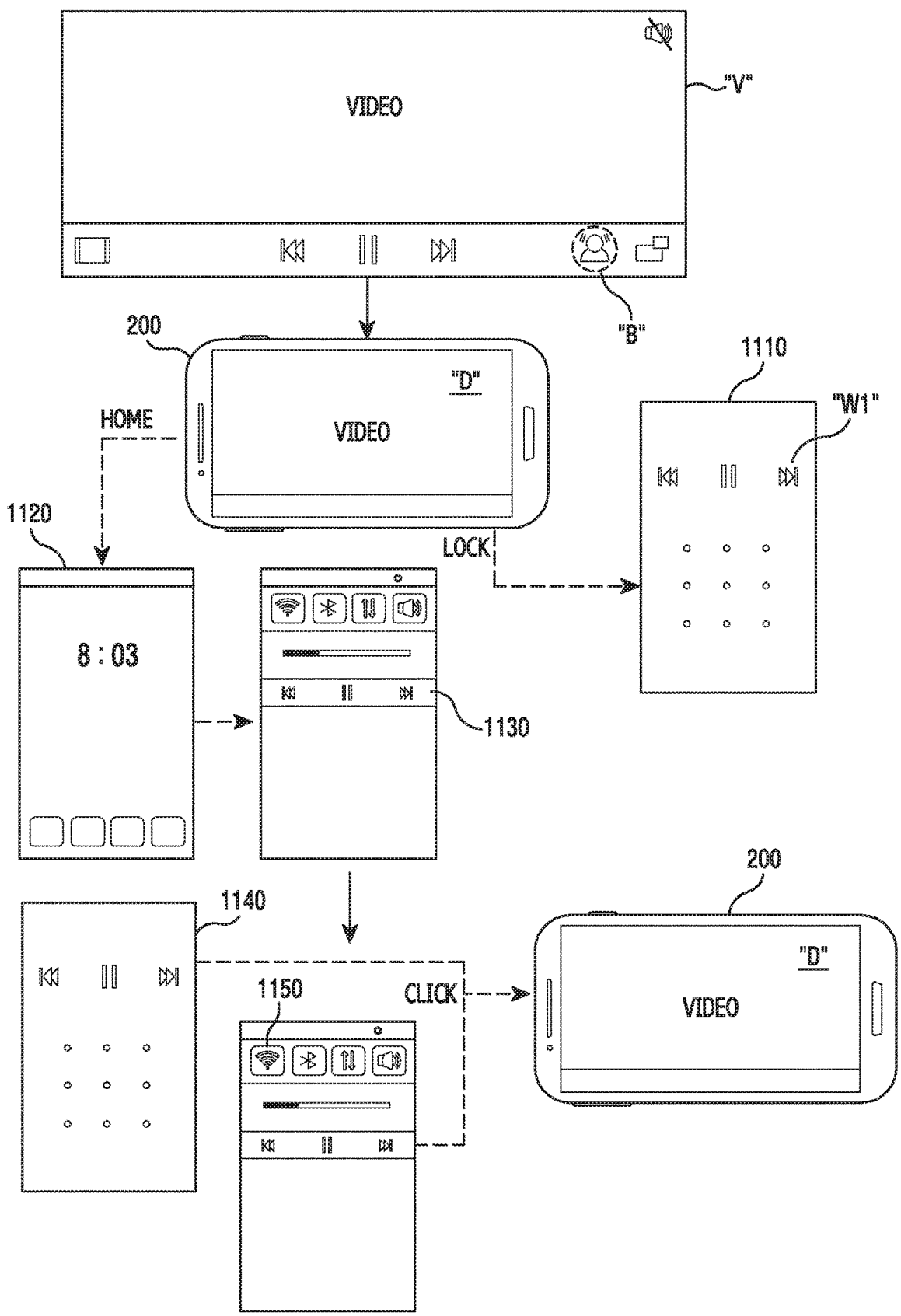
FIG. 11 is a use-case diagram of an example software system according to an embodiment of the present disclosure.

FIG. 11 illustrates a use-case diagram of a software system according to an embodiment of the present disclosure.

Referring to FIG. 11, in changing the state of any one or both of the media or video player application and the electronic device 200, the present disclosure may utilize button "B" of the electronic device 200 to trigger audio-only mode in a video player application. As such, the present disclosure may cause change in the functions of "lock" or "power key" and "home button" of the electronic device 200. As shown in FIG. 11, when a video "V" is played and shown in the display screen "D" of the electronic device 200, and when the audio only-mode is activated, the power key of the electronic device 200 can now lock the electronic device 200 and not just the controls of the video player. During the playing of the video with audio-video file, when the user press the power key, the video's audio will play even if the screen is turned off (state 1110). At this mode, a lock screen widget "W1" which is the same with music player may appear on the output media component 214 or the display screen of the electronic device 200. The button "B" can be used to control the player as well as returning to the same video player. The button "B" may represent the control object through which the media container can be manipulated depending on whether the operating state of the video player application permits manipulation. The widget "W1" may also be arranged to be selectable from the media output component or display screen 246 of the electronic device 200. The home button, on the other hand, may permit users to return to their home screen without interrupting the audio of the video (state 1120). As such, there is no need to use the multi-window feature to continuously play the video. The use of multi-window for different applications, and the video player application may still run in background 270 (state 1130). While the audio-only mode is in operation, a notification may automatically show on the display screen 246 of the electronic device 200. This is done by clicking on services like notification and/or lock screen widget, that is arranged to redirect the user back to the video player application (state 1140). When the audio-only mode is enabled, there may also be a notification image indicating that the mode is enabled using a representative image of the audio-only mode of operation of the application. At this mode, when the audio-only is enabled and the device is not locked, there may also be a control in the notification panel that may permit the user to control the video player application (state 1150). As such, the user may not need multi-window feature to continuously play under the audio-only mode and go back to the video playback continuously.

One arrangement of the present disclosure may also be in the form of an apparatus for signal processing based on operating state-dependent handling of multimedia attributes. The apparatus comprises: (i) the OS 202; (ii) the media output component 214 interacting with the OS 202; and (iii) the media presentation system 204 running on the OS 202, wherein the media presentation system 204 receives from the source 206 the media file 208 which includes the media signals 210, wherein the media signals 210 include the media container 212 of a form suitable for representation on the media output component 214, wherein the media presentation system 204 plays the media file 208 by processing the media signals 210, and wherein, the media container 212 is manipulated depending on the operating state of at least one of the media presentation system 204 and the electronic device 200 while the media signals 210 are being processed.

Another arrangement of the present disclosure may also be in the form of a non-transitory computer-readable medium comprising computer executable instructions that when executed by the processing components 216 of the electronic device 200 cause the processing components 216 to effectuate a method which comprises the operations of: (i) running, on the electronic device 200 having the OS 202, the media presentation system 204; (ii) receiving, at the media presentation system 204, from the source 206 the media file 208 which includes the media signals 210, wherein the media signals 210 include the media container 212 of a form suitable for representation on the media output component 214 of the electronic device 200; (iii) playing, at the media presentation system 204, the media file 208 by processing the media signals 210; and (iv) manipulating, at the media presentation system 204, the media container 212 depending on the operating state of at least one of the media presentation system 204 and the electronic device 200 while the media signals 210 are being processed.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a ROM, a RAM, compact disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing form the spirit and scope of the present disclosure as defined by the appended claims and their equivalents.

What is claimed is:

1. A method for playing a media file in an electronic device, the method comprising:
   executing, by at least one processor of the electronic device, an application associated with the media file including audio contents and video contents;
   playing, by the at least one processor, the audio contents and the video contents of the media file in an audio-video mode by processing media signals including audio signals and video signals, the audio signals including the audio contents, the video signals including the video contents;
   identifying, by the at least one processor, whether a battery level is lower than a first threshold;
   identifying, by the at least one processor, whether a change of images constituting the video contents is fewer than a second threshold; and
   playing, by the at least one processor, the audio contents of the media file in an audio-only mode based on the battery level lower than the first threshold and the change of images constituting the video contents fewer than the second threshold.

2. The method of claim 1, wherein the media signals further comprise at least one media container comprising at least one video container and at least one audio container.

3. The method of claim 2, wherein the playing of the audio contents in the audio-only mode further comprises:
   playing, by the at least one processor, the audio contents by using the audio container.

4. The method of claim 2, further comprising:
   detecting, by the at least one processor, an event which triggers switching from the audio-only mode to the audio-video mode;
   executing, by the at least one processor, the application based on the event; and
   playing, by the at least one processor, the audio contents and the video contents of the media file in the audio-video mode, through the application,
   wherein the video container is inserted back into the video signals, and
   wherein the audio signals and the video signals to which the video container is inserted back are synchronized.

5. The method of claim 1, further comprising:
   detecting, by the at least one processor, an event which triggers switching from the audio-video mode to a video-only mode; and
   playing, by the at least one processor, the video contents of the media file in the video-only mode.

6. The method of claim 1, wherein the playing the audio contents of the media file in the audio-only mode comprises:
   removing, by the at least one processor, the at least one video container including the video contents from the video signals; and
   processing, by the at least one processor, media signals from which the at least one video container including the video contents is removed.

7. An electronic device comprising:
   at least one processor; and
   at least one memory coupled to the at least one processor and including instructions executable by the at least one processor, wherein the at least one processor is configured to execute the instructions to:
- execute an application associated with a media file including audio contents and video contents,
- play the audio contents and the video contents of the media file in an audio-video mode by processing media signals including audio signals and video signals, the audio signals including the audio contents, the video signals including the video contents,
- identify whether a battery level is lower than a first threshold,
- identify whether a change of images constituting the video contents is fewer than a second threshold, and
- play the audio contents of the media file in an audio-only mode based on the battery level lower than the first threshold and the change of images constituting the video contents fewer than the second threshold.

8. The electronic device of claim 7, wherein the media signals further comprise at least one media container comprising at least one video container and at least one audio container.

9. The electronic device of claim 8, wherein the at least one processor is further configured to execute the instructions to:
- play the audio contents by using the audio container.

10. The electronic device of claim 8, wherein the at least one processor is further configured to execute the instructions to:
- detect an event which triggers switching from the audio-only mode to the audio-video mode,
- execute the application based on the event, and
- play the audio contents and the video contents of the media file in the audio-video mode, through the application,
- wherein the video container is inserted back into the video signals, and
- wherein the audio signals and the video signals to which the video container is inserted back are synchronized.

11. The electronic device of claim 7, wherein the at least one processor is further configured to execute the instructions to:
- detect an event which triggers switching from the audio-video mode to a video-only mode; and
- play the video contents of the media file in the video-only mode.

12. The electronic device of claim 7, wherein the at least one processor is configured to execute the instructions to:
- remove the at least one video container including the video contents from the video signals, and
- process media signals from which the at least one video container including the video contents is removed.

13. A computer program device product comprising a non-transitory computer readable medium having computer executable instructions stored therein, wherein the computer executable instructions when executed on a computing device, cause the computing device to:
- execute an application associated with a media file including audio contents and video contents;
- play the audio contents and the video contents of the media file in an audio-video mode by processing media signals including audio signals and video signals, the audio signals including the audio contents, the video signals including the video contents;
- identify whether a battery level is lower than a first threshold;
- identify whether a change of images constituting the video contents is fewer than a second threshold; and
- play the audio contents of the media file in an audio-only mode based on the battery level lower than the first threshold and the change of images constituting the video contents fewer than the second threshold.

14. The computer program device product of claim 13, wherein the media signals further comprise at least one media container comprising the at least one video container and at least one audio container.

15. The computer program device product of claim 14, wherein the computer executable instructions, when executed on a computing device, further cause the computing device to:
- play the audio contents by using the audio container.

16. The computer program device product of claim 13, wherein the computer executable instructions, when executed on a computing device, further cause the computing device to:
- detect an event which triggers switching from the audio-video mode to a video-only mode; and
- play the video contents of the media file in the video-only mode.

17. The computer program device product of claim 13, wherein the computer executable instructions, when executed on a computing device, further cause the computing device to:
- remove the at least one video container including the video contents from the video signals; and
- process media signals from which the at least one video container including the video contents is removed.

* * * * *